United States Patent Office 2,759,373
Patented Aug. 21, 1956

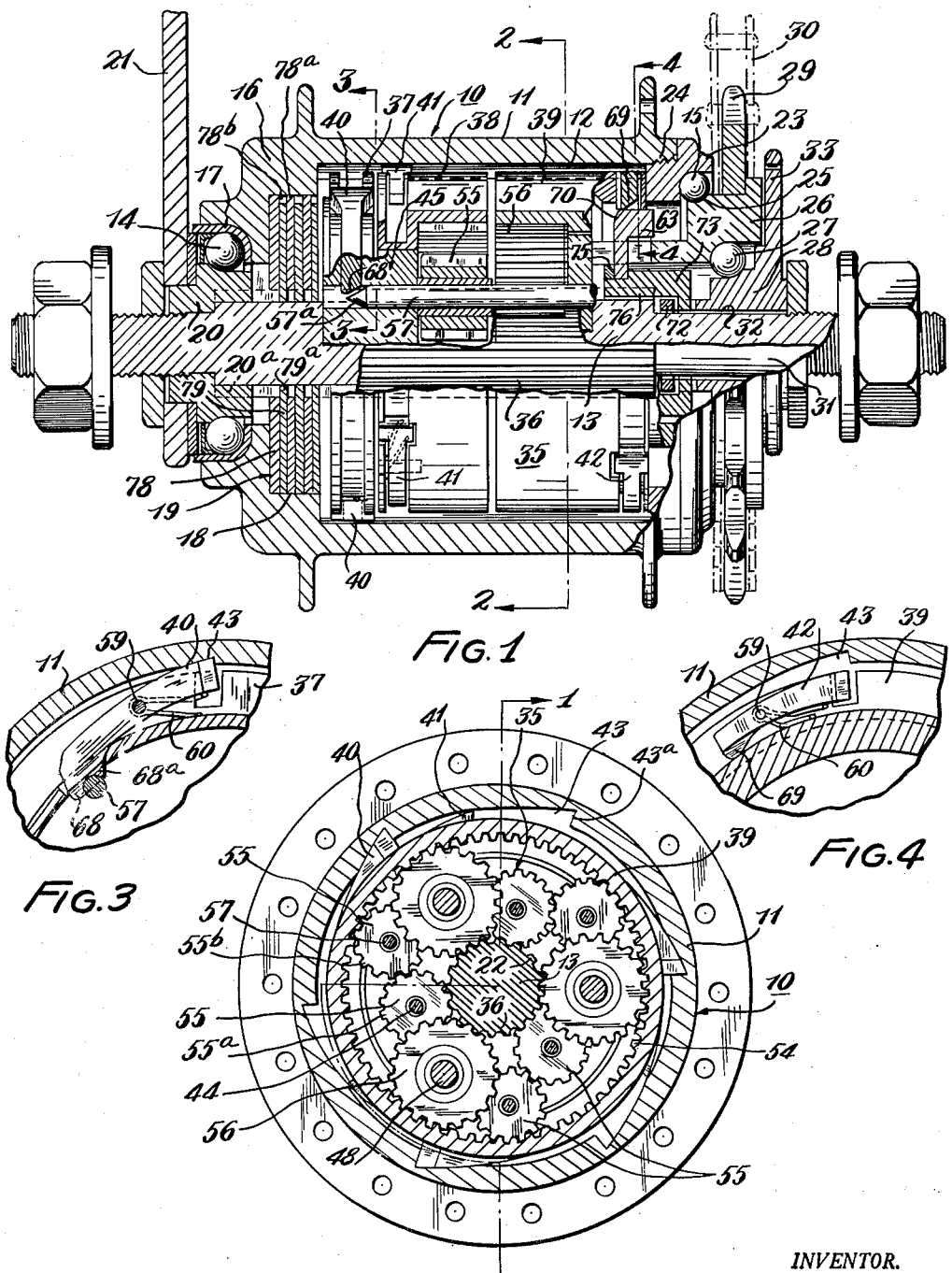
Aug. 21, 1956     D. W. ORCHARD     2,759,373
MULTIPLE SPEED BICYCLE TRANSMISSION
Filed March 11, 1954     2 Sheets-Sheet 1
INVENTOR.
DAVID W. ORCHARD
ATTORNEYS

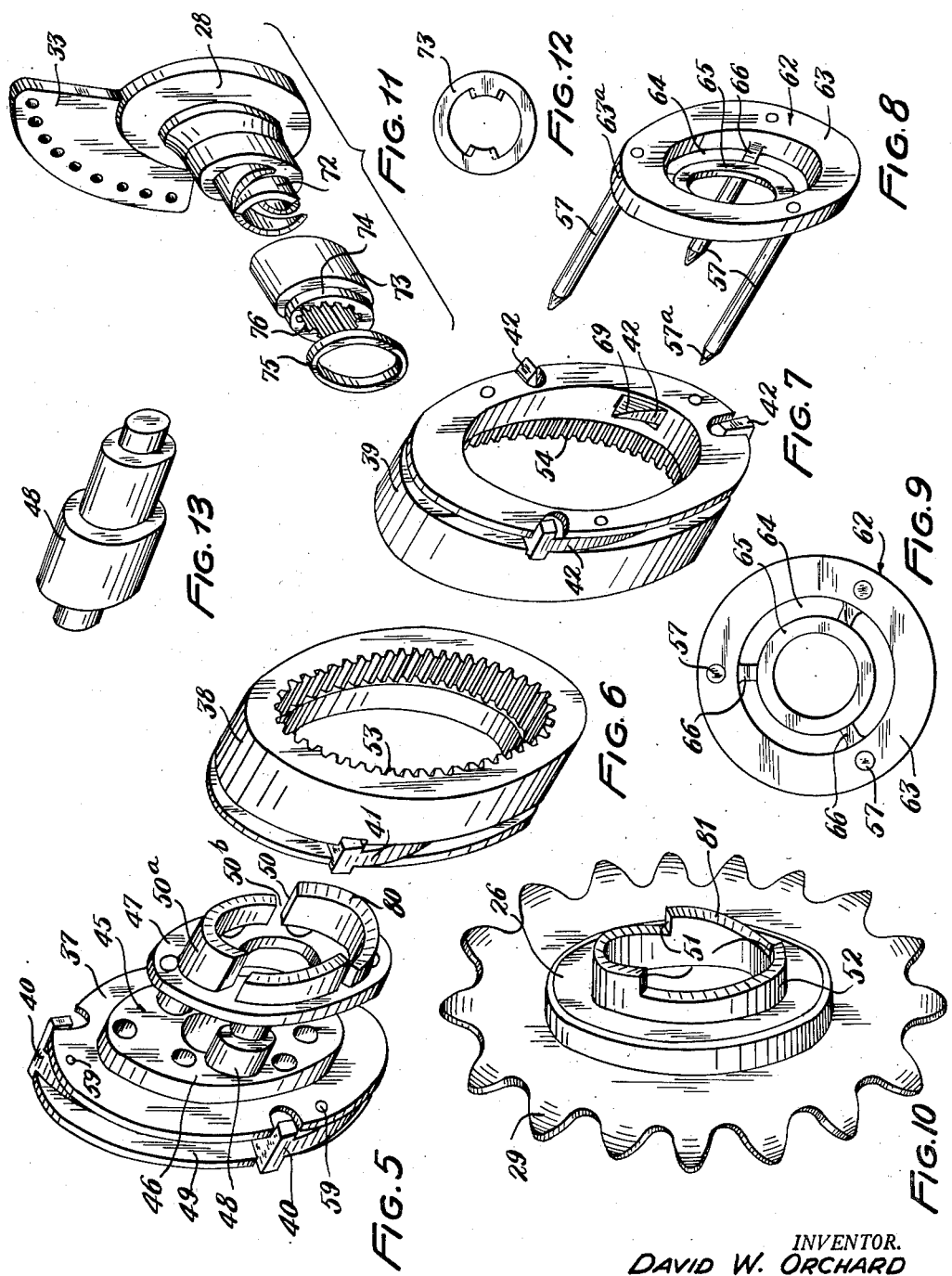

2,759,373

MULTIPLE SPEED BICYCLE TRANSMISSION

David W. Orchard, Willoughby, Ohio, assignor to Joseph E. Cole, Shaker Heights, Ohio Application March 11, 1954, Serial No. 415,561

19 Claims. (Cl. 74—750)

This invention relates to transmissions for bicycles and the like and, more particularly, to an improved three-speed transmission which is of a relatively simple, yet rugged construction and comprises component parts capable of being economically produced and assembled.

An object of this invention is to provide a multiple speed bicycle transmission embodying gearing which is constantly in mesh, and in which clutch members rotatable at different speeds are adapted to be selectively controlled for establishing releasable driving connection with a wheel hub, or the like, to be driven.

Another object is to provide such a multiple speed transmission in which the clutch members comprise clutch rings carrying pawls adapted for driving engagement in internal notches of the hub.

Still another object is to provide a multiple speed transmission of this character in which the gearing is of the planetary type comprising ring gears carried by the clutch rings, and in which sets of planet pinion gears providing different transmission ratios and meshing with the respective ring gears are carried by a driven cage.

Yet another object is to provide a multiple speed transmission of the kind above referred to in which the pawls of the clutch rings are adapted to be actuated by control means movable relative to the cage.

It is also an object of this invention to provide a multiple speed transmission of the character mentioned above in which the cage is rotatable in response to forward rotary movement of a driving member for propelling the planet pinions around a sun gear means, and in which a braking means is rendered effective on the hub in response to reverse rotary movement of the driving member.

As a further object, this invention provides a multiple speed transmission embodying such a braking means adapted to be actuated by axial movement of the cage, and in which the braking means comprises friction means held against rotation by meshed engagement with the sun gear means.

A still further object is to provide a three-speed transmission of the kind indicated above in which the clutch means comprises fast and slow clutch rings driven by planetary gearing and a clutch ring connected with the planet pinion cage, and in which groups of pawls carried by the clutch rings and adapted for driving engagement with internal notches of the hub are selectively controlled by a three-position clutch control means.

As another of its objects, this invention provides a multiple speed transmission of the kind mentioned above in which certain of the clutch pawls have finger projections engageable by a shifter means of the control mechanism for controlling the effectiveness of the pawls for driving engagement with the hub.

Still another object is to provide a multiple speed transmission of the character above indicated in which the shifter means is movable axially relative to the cage for selective engagement with different groups of clutch pawls, and in which the axial movement of the shifter means is imparted thereto in response to relative rotation between cooperating screw and nut members and one of which members is held against rotation by meshed engagement with the sun gear means.

Additionally, this invention provides a multiple speed bicycle transmission in which the pawls of all of the clutches are ratchet pawls urged toward an expanded condition for driving engagement in internal ratchet notches of the hub by spring means such that the hub can overrun all of the pawl groups, and in which the pawls on the higher speed clutch or clutches will establish driving engagement with the hub automatically in preference to the low-speed clutch, and the pawls of the low-speed clutch will establish driving engagement with the hub when the pawls of the higher speed clutch or clutches are rendered ineffective by the control means.

The invention can be further briefly summarized as consisting in certain novel combinations and arrangements of parts hereinafter described and particularly set out in the claims hereof.

In the accompanying sheets of drawings, forming a part of this specification:

Fig. 1 is an axial section taken through a multiple speed bicycle transmission embodying this invention, the view being taken substantially as indicated by section line 1—1 of Fig. 2;

Fig. 2 is a transverse section taken through the transmission as indicated by section line 2—2 of Fig. 1;

Fig. 3 is a fragmentary transverse section taken on section line 3—3 of Fig. 1 and showing a pawl of one of the clutches;

Fig. 4 is a fragmentary transverse section taken on section line 4—4 of Fig. 1 and showing a pawl of another of the clutches;

Fig. 5 is a perspective view showing the planet pinion cage and the clutch ring connected therewith, the cage being shown in detached relation and with the planet pinion gears removed therefrom;

Fig. 6 is a perspective view showing the low-speed clutch ring in detached relation;

Fig. 7 is a perspective view showing the high-speed clutch ring in detached relation;

Fig. 8 is a perspective view of the shifter spider in detached relation;

Fig. 9 is an end view of the shifter spider;

Fig. 10 is a perspective view of the drive member in detached relation;

Fig. 11 is an exploded perspective view showing the screw and nut members of the control means and the retaining ring for the shifter spider;

Fig. 12 is an end view of the nut member of the control means; and

Fig. 13 is a perspective view showing one of the planet pinion pivot shafts detached from the planet pinion cage.

By way of example, the improved multiple speed bicycle transmission 10 is disclosed herein as embodied in a substantially cylindrical hollow wheel hub 11, but it will be understood, of course, that the transmission can be applied to a bicycle, or the like, in various other ways and locations and, although the transmission 10 is disclosed herein as being a three-speed transmission, it will also be understood that it could be constructed as a transmission embodying either a smaller or larger number of transmission ratios.

The hub 11 is a generally cylindrical hollow hub having an axial chamber 12 therein and is supported for rotation about a fixed axle shaft 13 by means of suitable antifriction bearings 14 and 15. At one end thereof, the hub 11 is provided with a transverse end wall 16 having an outer race 17 mounted in or formed thereon for the antifriction bearing 14. The end wall 16 is provided with a counterbore 18 constituting an axial extension of the chamber 12 and forming a brake recess in which brake means 19 is located, as hereinafter described.

The shaft 13 projects through an opening of the end wall 16 and has an inner bearing cone 20 mounted thereon and forming an inner race for the antifriction bearing 14. The bearing cone 20 is held against rotation by a brake arm 21 which is adapted to be suitably secured to the frame of the bicycle. The shaft 13 is formed with teeth or splines 22 thereon and extending axially thereof for a substantial portion of the length thereof. The teeth 22 have meshed engagement with similar splines 20ᵃ formed in the bearing cone 20, such that the shaft is held against rotation by this bearing cone.

At the opposite end thereof, the wheel hub 11 is provided with an end ring 23, which is connected with the hub by a threaded connection 24 and forms an outer race for the antifriction bearing 15. This antifriction bearing 15 is supported by an inner race 25 formed on a drive member 26 and this drive member is, in turn, rotatably supported by an antifriction bearing 27 mounted on a control member 28.

The drive member 26 includes a sprocket 29 with which a conventional drive chain 30 is engaged. The control member 28 is rotatably supported on the plain stem portion 31 of the shaft 13 by suitable bearing means, such as the plain central hollow bearing 32 formed in this control member centrally thereof. The control member 28 also includes a radially projecting arm or sector 33 adapted to have a cable, Bowden wire or the like, connected therewith for rotating the control member in accordance with the speed setting desired for the transmission 10, as will be further explained hereinafter.

Transmission mechanism 35 is contained in the chamber 12 of the hub 11 and provides for connection of the drive member 26 with the hub at different transmission ratios. This transmission mechanism will be described next.

The transmission mechanism 35 includes a sun gear means 36 fixed on the shaft 13 and which, in this instance, is formed by the teeth or splines 22. The transmission mechanism 35 also comprises clutch members or rings 37, 38 and 39, which are rotatable about the shaft 13 and are adapted for driving engagement with the hub 11 through groups of clutch elements which, in this instance, comprise groups of pawls 40, 41 and 42 associated with the respective clutch members. When the clutch elements are in the form of the pawls 40, 41 and 42 just mentioned, the hub 11 is provided with annularly spaced internal notches 43 formed in the wall thereof and in which the pawls are drivingly engageable, as is explained hereinafter.

The clutch ring 37 is connected with, or formed as a part of, a cage 45 which is rotatable about the shaft 13 and forms a carrier for the planet pinion gears of certain planetary gearing which will be presently described. The clutch ring 38 is a low-speed clutch ring, and the clutch ring 39 is a high-speed clutch ring.

The cage 45 comprises axially spaced transverse annular wall members 46 and 47 connected by groups of axially extending pivot shaft members 44 and 48 whose ends are riveted, or otherwise secured, to the wall members 46 and 47. The clutch ring 37 is connected with and extends around the wall member 46 of the cage and is here shown as being provided with an annular radial groove 49 in which the pawls 40 are located.

As shown in Figs. 1 and 5, the cage 45 is also provided at the right end thereof with an annular group of axially projecting cam segments 50ᵃ whose end portions at the high ends thereof define drive teeth 50 adapted to be drivingly engaged by a similar group of drive teeth 51 defined by cam segments 51ᵃ carried by the tubular portion 52 of the drive member 26. The adjacent ends of the cam segments 50ᵃ are separated by axial slots 50ᵇ whose purpose is explained hereinafter. The cooperating drive teeth 50 and 51 are so formed that rotation of the drive member 26 in a clockwise direction, as viewed in Fig. 1, will impart a forward rotary movement to the cage 45 and to the clutch ring 37 with the clutch ring being driven at the same speed of rotation as the sprocket 29.

The gearing of the transmission mechanism 35 is of the planetary type and comprises ring gears 53 and 54 carried respectively by the clutch rings 38 and 39 and rotatable about the sun gear 30. The planetary gearing also comprises a set of planet pinion gears 55 for driving the clutch ring 38, and a set of planet pinion gears 56 for driving the clutch ring 39. The pinions 55 are disposed between and have meshed engagement with the ring gear 53 and the sun gear 36. The pinions 56 comprise pairs of individual gears 55ᵃ and 55ᵇ which are disposed between and have meshed engagement with the ring gear 54 and the sun gear such that each such pair of pinions forms a gear train between the ring gear 53 and the sun gear 36.

The planet pinion gears 56 are mounted on the cage 45 by being rotatable on the pivot shafts 48. The pinion gears 55ᵃ are mounted on the cage 45 by being rotatable on the pivot shafts 44. The pinion gears 55ᵇ are mounted on the cage 45 by being rotatable on pivot pins 58 which, as explained hereinafter, constitute a part of a control means which is movable relative to the cage.

When the cage 45 is driven in the forward direction by the drive member 26, the pivot shafts 44 and 58 for the planet pinion gears 55ᵃ and 55ᵇ, and the pivot shafts 48 for the planet pinion gears 56, cause these gears to be driven by the cage such that the gears 55ᵃ and 56 roll on and around the sun gear 36. The pairs of pinions 55ᵃ and 55ᵇ provide a low-gear ratio in the transmission mechanism 35, such that the clutch ring 38 will be driven at a relatively low speed. The rotation transmitted to the clutch ring 38 through the planet pinions 55ᵃ and 55ᵇ is actually a relative rotation in a counterclockwise direction, as seen in Fig. 2, but since the forward speed of rotation imparted to the cage by the drive member 26 is faster than this counterclockwise rotation being imparted to the clutch ring 38 by the gears 55ᵇ, the resultant movement of this clutch ring is a slow speed rotation in a forward direction.

The rotation of the planet pinions 56 around the sun gear 36 by the cage 45 causes these pinions to drive the ring gear 54 in a forward direction at a faster speed of rotation than the drive member 26, and hence, the clutch ring 39 is driven at a relatively faster rate than the sprocket 29. The planet pinions 56, therefore, provide a high-gear driving ratio for the hub 11.

From the description of the transmission mechanism 35, as thus far given, it will be seen that the clutch ring 37 is driven at the same speed as the sprocket 29 and thus provides a direct-drive or unit ratio drive for the hub 11, and that the gearing for the clutch ring 38 provides a low-gear ratio by which this clutch ring is driven at a slower speed than the clutch ring 37, while the gearing for the clutch ring 39 provides a high-gear ratio by which the latter clutch ring will be driven at a faster speed than the clutch ring 37. The gearing for the clutch ring 39, is therefore, in this instance an overdrive gearing, while the gearing for the clutch ring 38 constitutes an underdrive gearing. The gearing could, of course, be selected so as to provide other ratios, as for example, ratios which are both lower or both higher than the unit or direct drive ratio provided by the clutch ring 37.

The drive notches 43 of the hub 11 are shown as having an axial length, such as to span all three of the clutch rings 37, 38 and 39 and are in the form of ratchet notches providing rearwardly facing shoulders 43ᵃ adapted to be drivingly engaged by the pawls of the clutch rings. The groups of pawls are connected with and rockable on their clutch rings by means of pivot pins 59, such that the heads of the pawls will be engageable with the shoulders 43ᵃ of the notches by a forward rotation of the clutch rings relative to the hub 11. The pawls of all of the clutch rings have their head ends continuously urged outwardly toward an expanded condition of the pawl groups, as by suitable springs 60 located beneath the pawls.

The pawls 41 of the low-speed clutch ring 38 are always maintained in their expanded condition by the springs 60 for driving engagement of these pawls automatically in the notches 43 whenever the speed of this clutch ring is fast enough to cause such engagement. The pawls 40 of the clutch ring 37 and the pawls 42 of the high-speed clutch ring 39 are adapted to be controlled, such that these groups of pawls are engageable in the notches 43 only when these pawls are permitted to be moved to their expanded condition by the springs 60.

For controlling the groups of pawls 40 and 42, the cage 45 is provided with an axially movable control means in the form of a shifter spider 62 which will be described next. The shifter spider 62 comprises a collar 63 and a group of axial arms or pins carried thereby and constituting the above-mentioned pivot pins 57 of the planet pinion gears 55ᵇ. The collar 63 has annnular opening 64 therein through which the segments 50ᵃ of the cage 45 project for the teeth 50 to be drivingly engaged by the teeth 51 of the drive member 26.

The spider 62 also comprises an inner ring 65 which is connected with the collar 63 by radial arms 66. The inner ring 65 forms a connecting portion by which the movable control means is connected with the cage for imparting the axial movements thereto. The slots 50ᵇ of the cage 45 accommodate the radial arms 66 and permit the the axial movements of the spider relative to the cage. From the construction of the spider 62 and its association with the cage 45 as above explained, it will be understood that the spider rotates with the cage although being axially shiftable relative thereto.

The spider 62 has three different axial positions or speed settings to which it is movably axially of the cage 45. One of these positions is its extreme left-hand position in which the clutch rings 37 and 39 are both rendered ineffective for driving the hub 11 while the slow clutch ring 38 remains effective for driving the hub and which position of the spider can be referred to as the low speed or low gear setting. Another position of the spider 62 is its extreme right-hand position in which the fast clutch ring 39 remains effective for driving the hub 11 and which position of the spider can be referred to as its high-speed or high-gear setting. Still another of the positions for the spider 62 is an intermediate position in which the fast clutch ring 39 is rendered ineffective while the clutch ring 37 remains effective for driving the hub 11 and which intermediate position of the spider can be referred to as the direct drive or intermediate speed setting. The manner in which these settings of the spider render the clutch rings effective and ineffective will now be described in greater detail.

As shown in Fig. 3, the pawls 40 of the clutch ring 37 are provided with actuating fingers 68 extending inwardly of this clutch ring. These fingers provide a means by which these pawls can be swung on their pivot pins 59 in a direction to move the heads of the pawls of this group in opposition to the springs 60 to a contracted condition in which these pawls are ineffective for driving engagement with the notches 43 of the hub 11. The sides of the fingers 68 facing the spider 62 are chamfered or beveled, as indicated at 68ᵃ, such that the engagement of these beveled portions by the tapered ends 57ᵃ of the pins 57 will cause the above-mentioned retracting movement of the pawls 40. As long as the tapered ends 57ᵃ are in holding engagement with the fingers 68, the pawls 40 will be maintained in their retracted and ineffective position.

The pawls 42 of the high-speed clutch ring 39 also have beveled or chamfered actuating fingers 69 by which these pawls can be swung on their pivot pins 59 in opposition to the springs 60 and thereby moved inwardly to a contracted condition in which these pawls are ineffective for driving engagement in the notches 43 of the hub 11. The actuating fingers 69 are adapted to be engaged by an annular bevel 70 provided on the collar 63 of the spider 62 upon axial movement of the spider toward the left. This axial movement of the spider 62 causes the fingers 69 to travel up the bevel 70 onto the annular top surface 63ᵃ of the collar 63 thereby swinging the pawls 42 to their contracted condition and maintaining them in such contracted condition as long as the top of the collar 63 remains under these fingers.

When the spider 62 is moved toward the left for its full distance to its low-speed setting mentioned above, the tapered pin ends 57ᵃ engage the fingers 68 of the pawls 40 and the collar 63 engages the fingers of the pawls 42. While the shifter 62 remains in this innermost position, both groups of pawls 40 and 42 will be maintained in their retracted condition, thus leaving only the low-speed pawls 41 in their expanded condition. The pawls 41 thereupon establish driving engagement with the notches 43 and drive the hub 11 at the relative slow speed provided by the set of planet pinion gears 55.

When the spider 62 is moved only partway toward the left, that is, to its intermediate or direct drive setting, the collar 63 will be in engagement with the fingers 69 of the pawls 42 and will hold these pawls in their contracted condition while the tapered pin ends 57ᵃ are disengaged from the fingers 68. This will leave the pawls 41 and 42 in their expanded condition and, since the pawls 41 are rotating at a relatively faster rate of speed than the pawls 42, the pawls 41 will establish driving engagement with the notches 43 and will rotate the hub 11 with a direct drive or unit ratio drive.

When the spider 62 is moved for its full distance to right to its high-speed setting mentioned above the collar 63 is disengaged from the fingers 69 and the tapered pin ends 57ᵃ are likewise disengaged from the fingers 68. When the spider is in this position, the pawls of all three clutch rings 37, 38 and 39 are continuously urged toward their expanded condition by the springs 60. Since the high-speed clutch ring 39 will be rotating at a faster rate than the other clutch rings 37 and 38, the pawls 42 will engage in the notches 43 and will impart a corresponding high-speed rotation to the hub 11.

The axial movement of the spider 62 to the three control positions just described above is accomplished by movable control means extending into the hub 11 and which includes the rotatable control member 28. The connection between the movable control means and the spider is established through a pair of cooperating screw and nut members, of which the screw member 72 is formed on, or carried by, the inner end of the control member 28, and the nut member 73 is connected with the inner ring 65 of the spider. The nut member 73 is connected with the inner ring 65 with a push-pull connection which permits the spider to rotate around this nut member. This push-pull connection can be made by having a reduced or shouldered portion 74 extending into the opening of this inner ring and retained therein by a retaining ring 75 having a press fit on the reduced portion. The nut member 73 is held against rotation by having an internally splined portion 76 which is in meshed engagement with the sun gear 36, as shown in Fig. 1.

The control member 28 is rotated about the shaft 13 by movement applied to the arm or sector portion 33 and, when such movement is in a clockwise direction as viewed in Figs. 1 and 11, the nut member 73 will be pulled toward the right by the screw member 72, thereby imparting an outward or right-hand axial movement to the spider 62 for shifting the latter first to its intermediate or direct drive setting, and then to its high-speed or overdrive setting. Rotation of the control member 28 in a counterclockwise direction will cause inward or left-hand axial movement of the nut 73 to thereby shift the spider 62 from its high-speed or overdrive setting to its intermediate or direct drive setting and then to its low-speed or underdrive setting.

The brake means 19 can be of any suitable type and is here shown as comprising brake means of the friction disk type, having two groups of friction disks 78 and 79 in a stacked relation. The disks 78 and 79 are disposed in a staggered or alternating relation in the stack and are connected respectively with the hub 11 and the shaft 13. The disks 78 are connected with the hub 11 by having peripheral projections 78$^a$ engaged in annularly spaced axial slots 78$^b$ of the portion of the hub defining the brake recess 18 such that this group of disks is rotatable with the hub. The disks 79 are held against rotation by the shaft 13, and for this purpose are provided with splines or serrations 79$^a$ which have meshed engagement with the sun gear 36.

Braking force acting in a direction to compress the stacked disks 78 and 79, is applied to the disks by axial shifting of the cage 45 toward the left. This shifting of the cage is produced by cooperating inclined cam faces 80 and 81 provided respectively on the cage 45 and the drive member 26. The cam elements 80 of the cage constitute an annular group of these elements formed on the segments 50$^a$ adjacent the driving teeth 50. The cam elements 81 constitute an annular group of these elements formed on the tubular portion 52 adjacent the drive teeth 51 of the latter. When reverse rotary movement is imparted to the sprocket 29 by back-pedaling, the cam elements 81 impart a wedging action against the cam elements 80, thereby causing axial shifting of the cage 45 toward the left to compress the stack of friction disks 78 and 79 and apply a braking force to the hub 11.

The operation of the multiple speed transmission 10 has already been largely described above. It should be explained, however, that the notches 33 of the hub 11 and the pawls 40, 41 and 42 of the clutches, constitute a ratchet means which permits the hub to overrun all of the clutches. This overrunning of the hub permits a coasting action whenever the forward driving rotation of the drive member 26 is interrupted while the momentum of the bicycle continues to cause a forward rotation of the hub 11.

From the foregoing description and accompanying drawings, it will now be readily seen that this invention provides a multiple speed bicycle transmission which is of a rugged and durable construction comprising component parts adapted to be economically produced and assembled. Moreover, it will be seen that in this improved transmission, the reduction gearing is always in mesh such that shifting from one speed setting to another can be accomplished smoothly and without delay. Additionally, it will be seen that this transmission embodies a plurality of clutches associated with the different speed ratios and which clutches are rendered selectively effective for driving engagement with the hub by a manually operable control means movable to different settings corresponding with the desired speed ratios.

Although the bicycle transmission provided by this invention has been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. In a variable speed transmission, a fixed shaft, a hollow hub rotatable about said shaft, sun gear means on said shaft, a cage rotatable about said shaft and carrying two sets of planet pinions in mesh with said sun gear means and providing gear ratios of two different values, a drive member rotatable about said shaft and drivingly engaging said cage, clutch means comprising clutch devices adapted for driving connection with said hub and including ring gears in mesh with the respective sets of said planet pinions, and control means operable to control said clutch means for rendering a desired one of said gear ratios effective.

2. In a variable speed transmission, a fixed shaft, a hollow hub rotatable about said shaft, sun gear means on said shaft, a cage rotatable about said shaft and carrying two sets of planet pinions in mesh with said sun gear means and providing gear ratios of two different values, a drive member rotatable about said shaft and drivingly engaging said cage, ring gears in mesh with the respective sets of planet pinions, clutch means associated with one of said ring gears and adapted to establish driving connection with said hub, control means operable to render said clutch means effective or ineffective, and other clutch means associated with the other ring gear and operable to automatically establish driving connection with said hub when the first-mentioned clutch means is rendered ineffective by said control means.

3. In a variable speed transmission, a fixed shaft, a hollow hub rotatable about said shaft, sun gear means on said shaft, a first clutch ring in said hub surrounding said shaft, a second clutch ring in said hub surrounding said shaft, ring gears carried by said clutch rings, planet pinion gears disposed between and meshing with said sun gear means and said first clutch ring and providing a first transmission ratio, other planet pinion gears disposed between and meshing with said sun gear means and said second clutch ring and providing a second transmission ratio, a drive member rotatable about said shaft, cage means rotatable about said shaft and having pivot pins on which said pinion gears are rotatable, said cage means being drivingly engaged by said drive member for causing said pivot pins to propel said pinion gears around said sun gear means, one-way clutch means adapted to establish a drive connection between one of said clutch rings and said hub, other one-way clutch means adapted to establish a drive connection between the other of said clutch rings and said hub, and control means operable to render one of said one-way clutch means effective or ineffective.

4. In a variable speed transmission, a fixed shaft, a hollow hub rotatable about said shaft, sun gear means fixed on said shaft, a cage rotatable about said shaft and carrying two sets of planet pinions in mesh with said sun gear means and providing gear ratios of two different values, a drive member rotatable about said shaft and drivingly engaging said cage, ring gears in mesh with the respective sets of planet pinions, a first clutch means adapted to establish a drive connection between said cage and said hub, a second clutch means adapted to establish a drive connection between one of said ring gears and said hub, a third clutch means adapted to establish a drive connection between the other of said ring gears and said hub, and control means movable to different positions for selectively rendering different ones of said clutch means effective.

5. In a three speed bicycle transmission, a shaft having sun gear means thereon, a hollow hub rotatable about said shaft, a cage rotatable about said shaft and carrying two sets of planet pinions in mesh with said sun gear means and providing a low-gear ratio and a high-gear ratio, a rotatable drive member engageable with said cage to drive the same, a first ring gear in mesh with the low-gear pinions and carrying a first clutch means adapted for driving engagement with said hub, a second ring gear in mesh with the high-gear pinions and carrying a second clutch means adapted for driving engagement with said hub, a third clutch means carried by said cage and engageable with said hub for establishing a direct-drive connection therewith, and control means movable to a plurality of positions for selectively rendering different ones of said clutch means effective.

6. In a three speed bicycle transmission, a fixed axle shaft having a fixed sun gear thereon, a hollow hub rotatable about said shaft, a cage rotatable about said shaft and carrying two sets of planet pinions in mesh with said sun gear and providing a low-gear ratio and an overdrive ratio, a rotatable drive member engageable with said cage to drive the same, a first ring gear in mesh with the low-gear pinions and carrying a first clutch means adapted for driving engagement with said hub, a second ring gear in mesh with the overdrive pinions and carrying a second clutch means adapted for driving engagement with said hub, a third clutch means carried by said cage and engageable with said hub for establishing a direct-drive connection therewith, and three-position movable control means for selectively rendering any one of the three clutch means effective for establishing said driving engagement with said hub.

7. In a variable speed transmission, a sun gear, a hollow tub rotatable about said sun gear, a cage rotatable about said sun gear and carrying two sets of planet pinions in mesh with said sun gear and providing gear ratios of two different values, a drive member rotatable about said shaft and engageable with said cage to drive the same, ring gears in mesh with the respective sets of planet pinions, groups of clutch elements carried by said ring gears and being expansible into driving engagement with said hub, means urging said groups of clutch elements toward their expanded condition, and control means effective on said groups of clutch elements to selectively contract the same.

8. In a variable speed transmission, a sun gear, a hollow hub rotatable about said sun gear, a cage rotatable about said sun gear and carrying two sets of planet pinions in mesh with said sun gear and providing gear ratios of two different values, a drive member rotatable about said shaft and engageable with said cage to drive the same, ring gears in mesh with the respective sets of planet pinions, groups of clutch elements carried by said ring gears and cage and being expansible into driving engagement with said hub, means urging said groups of clutch elements toward their expanded condition, and control means engageable with the clutch elements of at least two of said groups and being movable to different control positions for selectively rendering the clutch elements of said two groups effective and ineffective for said driving engagement.

9. In a variable speed transmission; a sun gear, a hollow hub rotatable about said sun gear; a cage rotatable about said sun gear; sets of high-speed and low-speed planet pinions carried by said cage and being in mesh with said sun gear and providing high-speed and low-speed gear ratios; a drive member rotatable about said shaft and engageable with said cake to drive the same; high-speed and low-speed ring gears meshing respectively with the high-speed and low-speed pinions; groups of clutch elements carried by said ring gears and cage and being expansible into driving engagement with said hub; spring means urging said clutch elements toward their expanded condition; and three-position movable control means having one position holding the clutch elements of said cage and said high-speed ring gear in their contracted condition while said spring means holds the clutch elements of said low-speed ring gear in their expanded condition, a second position holding the clutch elements of said high speed ring gear in their contracted condition while said spring means holds the clutch elements of said cage and said low speed ring gear in their expanded condition and a third position in which the clutch elements of all three groups have been released by said control means and are held in their expanded condition by said spring means.

10. In a multiple speed coaster brake; an axle shaft having a sun gear thereon; a hollow hub rotatable about said shaft and having annularly spaced internal notches therein; a cage rotatable about said shaft; a drive member rotatable about said shaft; cooperating elements effective between said drive member and cage to cause the latter to be driven in response to rotary movement of said drive member in one direction and to cause axial movement of said cage in response to rotary movement of said drive member in the opposite direction; brake means effective to apply a braking action to said hub in response to said axial movement of said cage; a high-speed ring gear; a low-speed ring gear; high-speed planet pinions in said cage and having meshing engagement with said high-speed ring gear and said sun gear; low-speed planet pinions in said cage and having meshing engagement with said low-speed ring gear and said sun gear; annular groups of clutch pawls engageable in said notches and comprising a first group of pawls carried by said low-speed ring gear; a second group of pawls carried by said cage and a third group of pawls carried by said high speed ring gear; and control means operable to cause selective driving engagement of said groups of pawls in said notches.

11. A multiple speed coaster brake as defined in claim 10 in which said brake means comprises cooperating friction means one of which is rotatable with said hub and the other of which is held against rotation by meshed engagement with said sun gear.

12. In a multiple-speed bicycle transmission; a shaft; a hub rotatable therearound and having annularly spaced internal notches therein; a cage rotatable about said shaft and adapted to be driven; planetary gearing comprising a sun gear on said shaft, a ring gear adjacent said annular group of notches and planet pinions carried by said cage and meshing with said sun and ring gears; an annular group of pawls carried by said ring gear and being expansible for driving engagement in said notches; a shifter member movable axially of said cage and engageable with said pawls for selectively rendering the latter effective or ineffective for said driving engagement in said notches; and control means for causing the axial movement of said shifter member including threadedly connected control members disposed in said hub; one of said control members being rotatable about said shaft but held against axial movement and the other of said control members being axially shiftable but held against rotation by meshed engagement with said sun gear.

13. In a multiple-speed bicycle transmission of the planetary type; a shaft; a hub rotatable therearound and carrying annularly spaced internal notches; a cage rotatable about said shaft and adapted to be driven; a first clutch ring connected with said cage and located substantially opposite said notches; a second clutch ring surrounding said cage; planetary gearing comprising a sun gear on said shaft, a ring gear on said second clutch ring and planet pinions carried by said cage and meshing with said sun and ring gears; an annular group of clutch elements effective as a one-way releasable driving connection between said second clutch ring and said hub; an annular group of pawls carried by said first clutch ring and being expansible for driving engagement in said notches; a shifter spider movable axially of said cage and having pins engageable with said pawls for selectively rendering the latter effective or ineffective for said driving engagement; and movable control means extending into said hub for imparting the axial movement to said spider.

14. In a multiple-speed bicycle transmission of the planetary type; a shaft; a hub rotatable therearound and carrying annularly spaced internal notches; a cage rotatable about said shaft and adapted to be driven; a first clutch ring connected with said cage and located substantially opposite said notches; a second clutch ring surrounding said cage; planetary gearing comprising a sun gear on said shaft, a ring gear on said second clutch ring and planet pinions carried by said cage and meshing with said sun and ring gears; an annular group of clutch elements effective as a one-way releasable driving connection between said second clutch ring and said hub; an annular group of pawls carried by said first clutch ring and being expansible for driving engagement in said notches; a shifter spider rotatable with said cage and also movable axially thereof; said spider comprising a collar and pins projecting from said collar and extending axially through said cage and engageable with said pawls for selectively rendering the latter effective and ineffective for said driving engagement; and control means extending into said hub for causing the axial movement of said spider including threadedly connected means one of which has a push-pull connection with said collar and is held against rotation by meshed engagement with said sun gear.

15. A transmission as defined in claim 14 in which the pins of said shifter spider form pivot pins for certain of the planet pinions of said planetary gearing.

16. In a multiple-speed bicycle transmission; a shaft; a hub rotatable therearound and carrying annularly spaced internal notches; a cage rotatable about said shaft and adapted to be driven; a first clutch ring connected with said cage and located substantially opposite said notches; a second clutch ring surrounding said cage and also located substantially opposite said notches; planetary gearing comprising a sun gear on said shaft, a ring gear on said second clutch ring and planet pinions carried by said cage and meshing with said sun and ring gears; annular groups of pawls carried by said first and second clutch rings and being expansible for driving engagement in said notches; said pawls having actuating fingers internally of said clutch rings; a shifter spider rotatable with said cage and also movable axially thereof for selectively rendering said groups of pawls effective and ineffective for said driving engagement; said spider comprising a collar engageable with the fingers of one group of said pawls and pins projecting from said collar and engageable with the fingers of the other group of said pawls; and movable control means extending into said hub for imparting the axial movement to said spider.

17. A transmission as defined in claim 16 in which the shifter spider has different settings to which it is axially movable for rendering said groups of pawls effective.

18. In a multiple-speed bicycle transmission; a shaft; a hub rotatable therearound and carrying annularly spaced internal notches; a cage rotatable about said shaft and adapted to be driven; a sun gear on said shaft; a first clutch ring connected with said cage; a fast ring gear spaced axially from said first clutch ring and gear; a slow ring gear disposed between said first clutch ring and said fast ring and gear; planet pinion gears carried by said cage and having meshed engagement with said sun gear and said fast ring gear; other planet pinion gears carried by said cage and having meshed engagement with said sun gear and said slow ring gear; pawls carried by said first clutch ring and said fast ring gear and having actuating fingers extending inwardly of the members by which said pawls are carried; spring means urging said pawls outwardly for driving engagement with said notches; a shifter spider rotatable with said cage and also movable axially relative thereto; said spider having a collar engageable with the fingers of the fast ring gear pawls for retracting the same and pins projecting from said collar and engageable with the fingers of the first clutch ring pawls for retracting the latter; movable control means extending into said hub for imparting the axial movement to said spider; pawls carried by said slow ring gear; and spring means urging the last-mentioned pawls outwardly for driving engagement with said notches while said first clutch ring pawls and said slow ring gear pawls are held retracted by said spider.

19. A transmission as defined in claim 18 in which said notches and pawls constitute a ratchet means which permits said hub to overrun said first clutch ring and said fast and slow ring gears.

References Cited in the file of this patent
UNITED STATES PATENTS

| | | |
|---|---|---|
| 931,656 | Sangster | Aug. 17, 1909 |
| 1,277,070 | Harrison | Aug. 27, 1918 |